Figure 1:
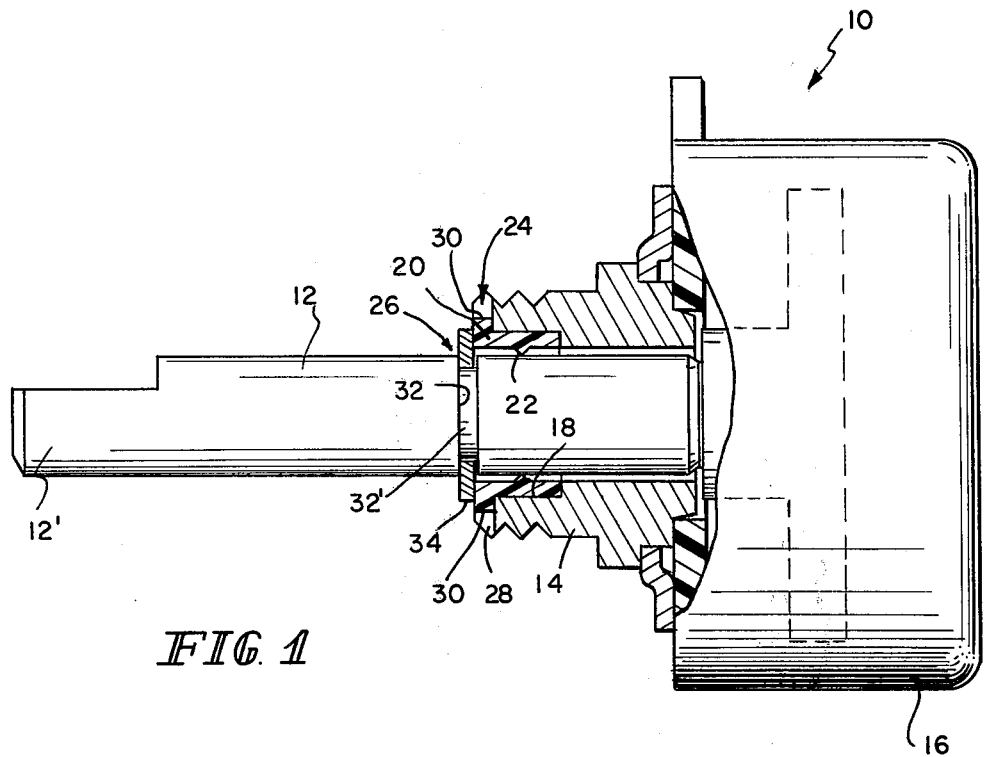

United States Patent [19]

George et al.

[11] 3,999,874
[45] Dec. 28, 1976

[54] CONTROL SHAFT FOR A VARIABLE RESISTANCE CONTROL

[75] Inventors: Lee R. George; Edgar F. Hauenstine, both of Frankfort, Ind.

[73] Assignee: P. R. Mallory & Co. Inc., Indianapolis, Ind.

[22] Filed: June 30, 1975

[21] Appl. No.: 591,848

[52] U.S. Cl. ............................. 403/165; 308/238; 338/162; 403/372
[51] Int. Cl.² ...................................... F16C 23/00
[58] Field of Search .......... 338/174, 162; 308/238; 403/165, 372

[56] References Cited
UNITED STATES PATENTS

| | | | |
|---|---|---|---|
| 2,781,436 | 2/1957 | Barden | 338/162 X |
| 2,886,680 | 5/1959 | Bugg | 338/174 X |
| 2,942,220 | 6/1960 | Elliott et al. | 308/238 X |
| 3,129,400 | 4/1964 | Hartman | 338/162 |
| 3,655,226 | 4/1972 | Cowan | 403/165 |
| 3,687,509 | 8/1972 | Schweizer | 308/238 X |
| 3,691,504 | 9/1972 | Puerner | 338/174 |

Primary Examiner—Andrew V. Kundrat
Attorney, Agent, or Firm—Hoffmann, Meyer & Coles

[57] ABSTRACT

A sleeve is trapped in a counter bore of a bushing, the sleeve being adapted to provide a bearing surface for a rotating shaft.

4 Claims, 2 Drawing Figures

CONTROL SHAFT FOR A VARIABLE RESISTANCE CONTROL

Generally speaking the present invention relates to an improvement in a variable resistance control wherein a shaft rotates within a bushing, the improvement comprising a counter bore in an end of the bushing, a sleeve carried in the counter bore, a means carried by the bushing holding the sleeve to prevent rotation thereof, and means carried by the shaft trapping the sleeve in the counter bore, the sleeve being adapted to provide a bearing surface for the shaft.

The present invention pertains to a means of improving the manner in which a shaft rotates in a variable resistance control and more particularly to the manner in which the shaft rotates in a bushing.

In variable resistance controls a shaft is rotated to turn a rotor, the rotor carrying electrical contacts to provide an electrical bridge between a resistance element and a common collector. Typical of such variable resistors is that described in U.S. Pat. No. 3,691,504 "Variable Resistor With Collector and Grounding Contact" issued Sept. 12, 1972 to George O. Puerner which is incorporated herein by reference. As illustrated in the patent a shaft is journalled in the base of a cup shaped housing at one end and rotates within a bushing member. There are many problems associated with such shaft arrangements such as: shaft rattle, shaft sealing, creeping of the shaft during rotation, and achieving a so-called "velvet touch" for good feel of the shaft and thus better control.

One way of solving such problems, and has been done in many other such controls, is that shown in the above-noted patent; that is, provide a means to achieve a more limited bearing surface for the shaft with a closer tolerance. In the case of the above-noted patent this was done by providing an inwardly projecting flange at the end of the bushing. The problem with this approach is that the bearing surface is still part of an element that is relatively large and which is being used to carry the whole unit on a panel. Therefore, it is still difficult to solve the above-noted problems.

Figure 2:
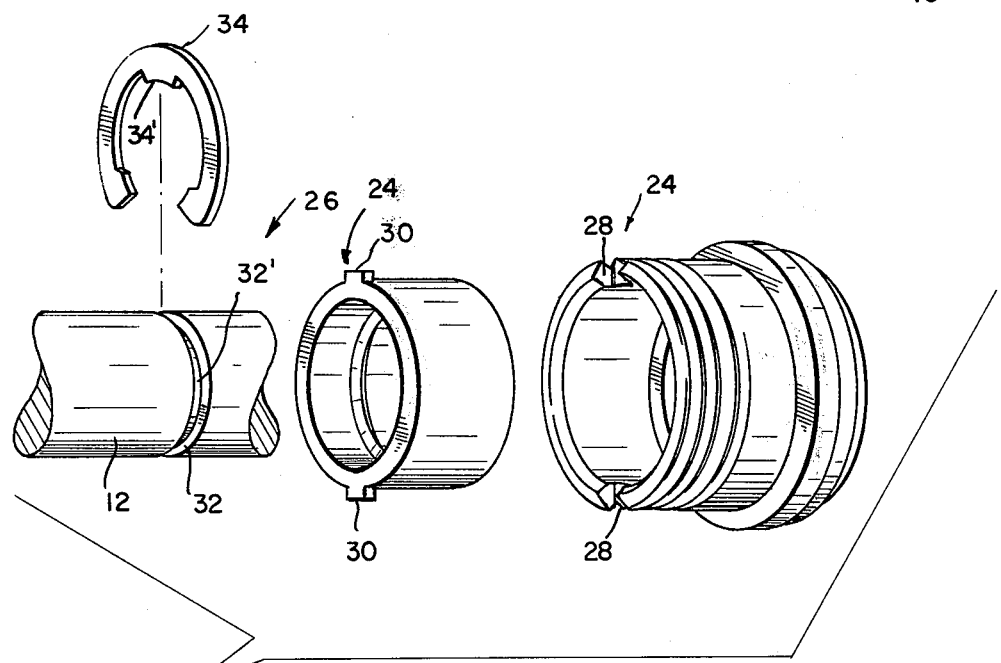

Accordingly it is a feature of the present invention to provide an improvement in variable resistance controls wherein a better bearing surface is provided for a rotating shaft. Another feature of the invention is the provision of an improvement in a variable resistance control wherein a shaft rotates in a bushing. Another feature of the invention is to provide such an improvement wherein a sleeve is carried in a counter bore of a bushing, the sleeve being adapted to provide a bearing surface for a rotating shaft. Still another feature of the invention is to provide such an improvement wherein the sleeve is held from rotation and axial movement. Yet still another feature of the invention is to provide such an improvement wherein the sleeve carries a rib which provides an interference fit with the rotating shaft. These and other features of the invention will become apparent from the following description taken in conjunction with the accompanying drawings wherein:

FIG. 1 is an elevation of a variable resistance control unit with portions broken away; and FIG. 2 is an exploded view of the bushing of the device and the cooperating sleeve and shaft.

Referring to the drawings, there is shown a variable resistance control 10 of the type shown in the above-noted U.S. Pat. No. 3,691,504 which has been incorporated herein by reference. The control includes a shaft 12 which is rotatable within a bushing 14, the shaft being journalled for rotation in the base of cup shaped housing 16 in the manner illustrated in U.S. Pat. No. 3,691,504. In use, the control device 10 may be mounted to a panel by threading bushing 14 into the panel.

According to the invention, the control is improved by providing a counter bore 18 in an end of bushing 14 into which a sleeve 20 is inserted, the sleeve being adapted to provide a bearing surface for the rotating shaft 12. The sleeve is so adapted by providing a rib 22 which extends around at least a portion of the bore of the sleeve. Such rib provides an interference fit with shaft 12 thus providing an excellent bearing surface, an excellent seal, and because of the tightness of the fit a "velvet touch".

Referring particularly to FIG. 2, there is a means 24 preventing rotation of sleeve 20 and a means 26 preventing axial movement of the sleeve. Means 24 includes at least one slot 28 provided in an end of the bushing and at least one tab 30 engaging the slot. Means 26 includes a groove 32 in shaft 12 which receives a C-ring 34, the C-ring having tabs 34' engaging the outer diameter of shaft 12 in the groove. As shown the C-ring traps the sleeve in counter bore 18 to prevent axial movement of the sleeve.

A suitable knob is provided on the end 12' for ease of rotation of the shaft. Rotation of the shaft varies the resistance of the unit in the manner described in the aforementioned U.S. Pat. No. 3,691,504.

What is claimed is:

1. In a variable resistance control device wherein a shaft is rotatable within a bushing, the improvement comprising:
   a. a counter bore in an end of said bushing,
   b. a sleeve carried in said counter bore having a bore and a rib carried therein to provide an interference fit with said shaft,
   c. means carried by said bushing holding said sleeve to prevent rotation thereof, and
   d. means carried by said shaft trapping said sleeve in said counter bore to prevent axial movement thereof,
   said rib providing a bearing surface for said rotating shaft.

2. In a variable resistance control according to claim 1 wherein said means preventing rotation of said sleeve includes at least one slot in said end of said bushing, said sleeve having a tab engaging said slot.

3. In a variable resistance control according to claim 1 wherein said means carried by said shaft trapping said sleeve includes a ring engaging an end of said sleeve.

4. In a variable resistance control according to claim 3 wherein said ring is a C-ring and said shaft includes a groove receiving said C-ring.

* * * * *